Dec. 17, 1929.  C. E. SCHARDEIN  1,739,864
FAUCET
Filed Aug. 9, 1928
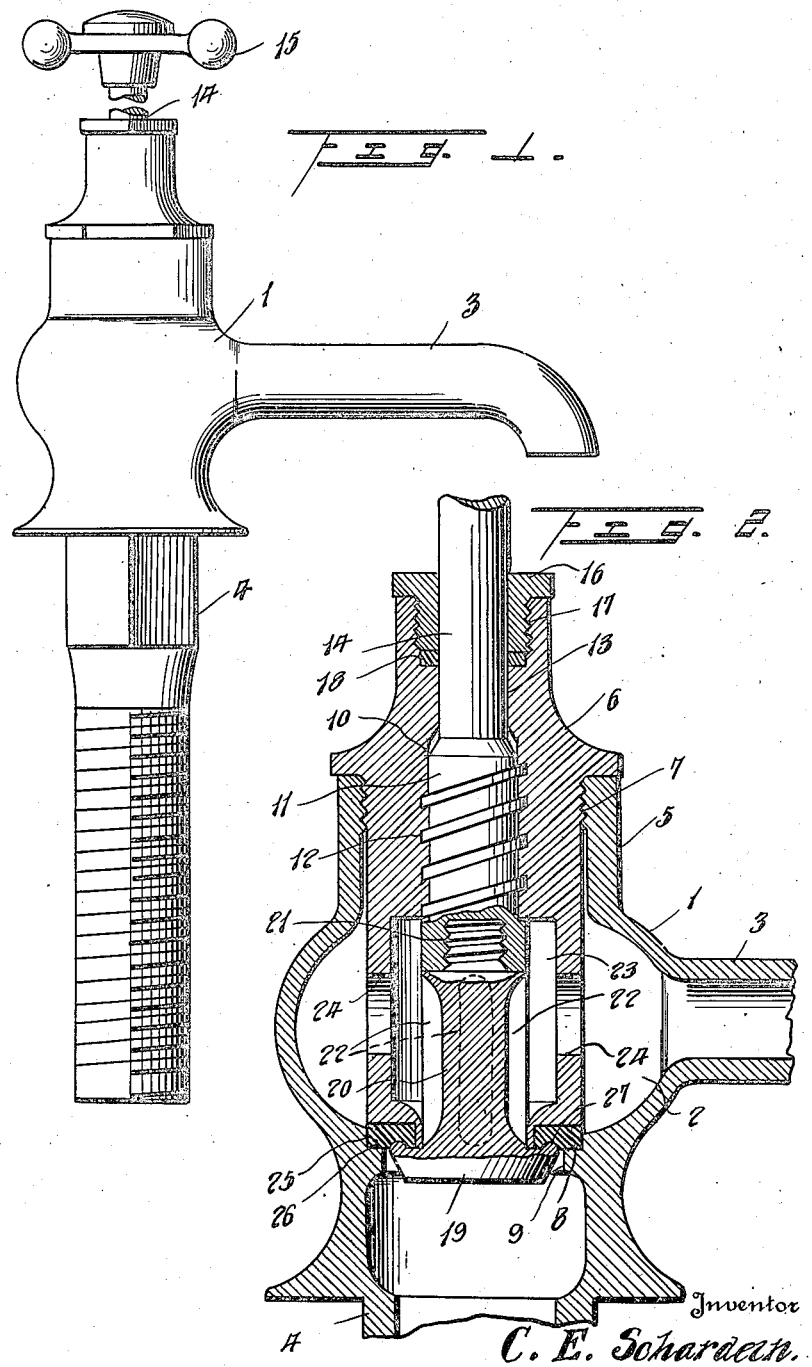
Inventor
C. E. Schardein.
By L. F. Randolph Jr.
Attorney Patented Dec. 17, 1929

1,739,864

UNITED STATES PATENT OFFICE

CLARENCE E. SCHARDEIN, OF LOUISVILLE, KENTUCKY

FAUCET

Application filed August 9, 1928. Serial No. 298,548.

The invention relates to water faucets and has for its object the provision of an improved construction of valve assembly for faucets by which the faucet may be quickly and efficiently repaired and worn parts replaced, and one in which the valve mechanism is extremely efficient in operation and so arranged that the valve is held in closed position by the pressure of water behind the valve, the valve being opened against the pressure of the water.

The invention will be described in detail hereinafter and will be found illustrated in the accompanying drawings, in which Figure 1 is a side view in elevation of the improved water faucet, and Figure 2 is a longitudinal sectional view of a fragment of a faucet showing the valve mechanism.

In the drawings similar reference characters are used to designate corresponding parts in both of the views.

The improved faucet comprises a body portion 1 having a chamber 2 with which communciates a nozzle 3, and a tubular stem 4. Tubular neck portion 5 also communicates with the chamber 2 to receive a valve plug 6, said neck portion having internal threads 7 to engage the threaded portion of said valve plug to hold it in position, and seated on the shoulder 8 formed on an annular flange 9 extending inwardly of the body 1 below the chamber 2. The plug 6 is provided with a tubular opening 10 through which the valve stem 11 is extended and operable by means of threaded portion 12 engaging internal threads in said opening 10. The upper portion of the opening 10 is reduced in diameter as shown at 13 to receive the reduced portion 14 of the valve stem to which is secured a suitable operating handle or head 15. 16 indicates a packing nut engaging in recess 17 in the upper portion of the valve plug 6, 18 indicating the packing for said valve stem. The inner end of the valve stem 11 is provided with a valve head 19 that is formed integral with the valve member 20 that is removably engaged with the lower end of the valve stem 11 as shown at 21, but obviously the part 20 may be made integral with said valve stem 11 if desired.

The member 20 is provided with longitudinal grooves 22 that serve as passageways for the water when the valve head 19 is unseated from the lower end of the valve plug 6, the water being discharged into chamber 23 in said valve plug, the walls of which are provided with openings 24 communicating with the chamber 2. The inner end of the valve plug 6 is formed with an annular groove 25 in which is seated an annular gasket 26, and the valve head 19 is provided with an annular flange 27 that seats against the gasket 26 and thereby make a complete water seal.

It will be understood that repairs and replacement may be effected by removing the valve plug from engagement with the neck portion 5 and that after removal of the handle or head 16 the valve stem 11 may be removed from the valve plug 6 to permit replacement of the gasket 26 and any other repairs that may be necessary, and after reassembling may again be inserted in the neck portion 5.

What is claimed is:—

In a faucet, a body having a chamber, a nozzle communicating with said chamber, a neck portion also communicating with said chamber, said body having an inlet opening communicating with the chamber, an annular shoulder surrounding the wall of said opening, a valve plug engaging the interior of the neck portion and seating on said shoulder, said plug having a tubular bore therethrough, the underside of said plug having an annular groove, a packing ring seated in said groove, the valve plug having an enlarged chamber communicating with said tubular bore and having openings in the walls of said chamber connecting said chamber with the chamber in the faucet body, the bore in the plug having a reduced upper portion, a valve stem mounted in said tubular bore and threadedly engaging the larger portion thereof, a head on the lower portion of the valve stem, and an upstanding annular flange on said head to engage said packing ring.

In testimony whereof I affix my signature.

CLARENCE E. SCHARDEIN.